United States Patent
Montanari et al.

(10) Patent No.: US 9,290,583 B2
(45) Date of Patent: Mar. 22, 2016

(54) PROCESS FOR WASHING A POLYSACCHARIDE-BASED MATERIAL WHICH HAS BEEN SUBJECTED TO AN OXIDATION

(75) Inventors: Suzelei Montanari, Trevoux (FR); Jean Stephane Condoret, Toulouse (FR); Severine Camy, Toulouse (FR); Benjamin Renault, Caluire (FR)

(73) Assignee: Sofradim Production (FR)

( * ) Notice: Subject to any disclaimer, the term of this patent is extended or adjusted under 35 U.S.C. 154(b) by 968 days.

(21) Appl. No.: 13/393,855

(22) PCT Filed: Sep. 3, 2010

(86) PCT No.: PCT/FR2010/051839
§ 371 (c)(1),
(2), (4) Date: Apr. 25, 2012

(87) PCT Pub. No.: WO2011/027084
PCT Pub. Date: Mar. 10, 2011

(65) Prior Publication Data
US 2013/0048030 A1    Feb. 28, 2013

(30) Foreign Application Priority Data
Sep. 3, 2009 (FR) .................... 09 56005

(51) Int. Cl.
*B08B 7/00* (2006.01)
*C08B 15/04* (2006.01)

(52) U.S. Cl.
CPC .............. *C08B 15/04* (2013.01); *B08B 7/0021* (2013.01); *Y02P 20/544* (2015.11)

(58) Field of Classification Search
CPC ........... C08B 15/04; A61L 15/28; C08L 1/02; C08L 1/04; B08B 7/0021

USPC ........................ 134/26; 536/56, 57
See application file for complete search history.

(56) References Cited

U.S. PATENT DOCUMENTS

| 3,364,200 A | 1/1968 | Ashton et al. |
| 2007/0032805 A1 | 2/2007 | Therin et al. |
| 2007/0213522 A1 | 9/2007 | Harris et al. |

FOREIGN PATENT DOCUMENTS

| FR | 2 873 700 A1 | 2/2006 |
| JP | 2002004169 A * | 1/2002 |

OTHER PUBLICATIONS

Machine translation for JP2002004169A, K. Mishima, 2002.*
English abstract for JP2002004169A, K. Mishima, 2002.*
International Search Report for Application No. PCT/FR2010/051839 mailed Nov. 22, 2010.
Australian Examination Report corresponding to Australian Appln. No. 2010291037 dated Aug. 14, 2015.

* cited by examiner

*Primary Examiner* — Michael Kornakov
*Assistant Examiner* — Natasha Campbell

(57) ABSTRACT

The present invention relates to a process for washing a polysaccharide-based material which has been subjected to oxidation by at least one oxidizing agent, the said process comprising a first stage of washing with a first densified fluid which is inert with regard to the said oxidizing agent, characterized in that the first stage is followed by a second stage of washing with a washing composition comprising at least one second inert densified fluid and at least one alcohol. The said process according to the invention can additionally comprise a third stage of washing with a third inert densified fluid in order to remove the said alcohol deposited on the said polysaccharide-based material during the said second washing stage. Preferably, the said inert densified fluids are supercritical carbon dioxide.

17 Claims, 1 Drawing Sheet

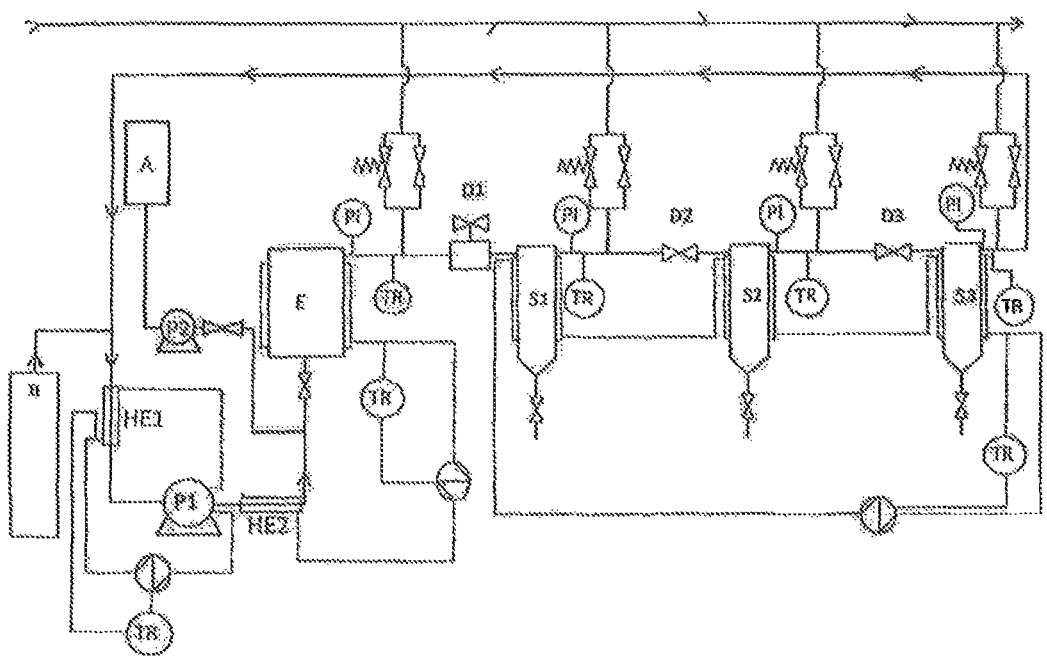

PROCESS FOR WASHING A POLYSACCHARIDE-BASED MATERIAL WHICH HAS BEEN SUBJECTED TO AN OXIDATION

CROSS-REFERENCE TO RELATED APPLICATIONS

This application is a U.S. National Stage Application filed under 35 U.S.C. §371(a) of International Application No. PCT/FR2010/051839, filed Sep. 3, 2010, which claims the benefit of and priority to French Application 09/56005 filed Sep. 3, 2009, the entire contents of which are incorporated by reference herein.

The present invention relates to a process for washing a polysaccharide-based material which has been subjected to an oxidation by at least one oxidizing agent.

The oxidation of a polysaccharide by nitrogen dioxide ($NO_2/N_2O_4$) and more particularly cellulose consists in converting a primary hydroxyl group of an anhydroglucose unit into a carboxyl group. Nitrogen dioxide ($NO_2$), which coexists with its dimeric form $N_2O_4$, is an oxidizing agent which makes it possible, according to the process chosen, to obtain a controlled degree of oxidation, indeed even a complete oxidation, of the said polysaccharide. An example of a process for the oxidation of a polysaccharide using nitrogen dioxide and/or its dimer $N_2O_4$ and employing an inert densified fluid is described in Patent Application WO 2006/018552. It is understood that other oxidizing agents can be used to obtain the same reaction for the oxidation of a polysaccharide.

It is understood, within the meaning of the present invention, that the term cellulose is used without distinction for all the crystalline forms of cellulose.

It is also understood, within the meaning of the present invention, that a densified fluid is composed of molecules which would be in the gas state under standard temperature and pressure conditions but which here are compressed to a pressure such that the said fluid no longer obeys the equation of state for ideal gases. At such a pressure, molecular interactions become significant. Within the meaning of the present invention, a fluid is "densified" when it is subject to temperature and pressure conditions which imply that its density is greater than or equal to 15% of the critical density of said fluid subjected to its critical pressure and its critical temperature. Such a densified fluid can thus be in the form of a gas, for example a dense gas, or a liquid. Densified fluids have been widely used in the extraction field for many years and are described, for example, in the following papers: "*Extraction of Natural Substances with Dense Gases*", Egon Stahl and Karl-Werner Quirin, Pharmaceutical Research, 1984, Volume 1, Number 5, pp. 189-194, and "*Dense Gases for Extraction and Refining*", E. Stahl, K.-W. Quirin and D. Gerard, Springer-Verlag, Berlin 1986.

Within the meaning of the present invention, a fluid is "inert" when it does not react with the oxidizing agent used for the stage of oxidation of the polysaccharide. Thus, an inert densified fluid is not oxidized or decomposed by the said oxidizing agent under the conditions of implementation of the process according to the invention. Alternatively, a fluid is inert if it makes it possible to obtain a substantially stable solution of the said oxidizing agent dissolved in the said fluid.

Among oxidized polysaccharides, oxidized cellulose is of major interest and the present invention is described more particularly with this. However, in the present invention, it is understood that oxidized cellulose can be replaced by any oxidized polysaccharide.

After such an oxidation treatment, cellulose, in particular, becomes resorbable by the human body and exhibits advantageous antibacterial and haemostatic properties; for this reason, it is widely used by the manufacture of products having medical or surgical uses.

Within the meaning of the present invention, the polysaccharide-based material can be provided in any form, in particular and not exhaustingly in the form of a powder, fibres, yarns or a film or in the form of a textile.

The use of nitrogen dioxide does, however, exhibit certain disadvantages. This is because the reaction for the oxidation of cellulose by nitrogen dioxide generates reaction or decomposition byproducts which are incompatible with, indeed even dangerous to, medical or surgical uses. Mention may in particular be made, among reaction or decomposition byproducts, of nitric acid and nitrous acid. Such byproducts can detrimentally affect or damage the oxidized cellulose or also render impossible exact control of the degree of oxidation of the latter.

Various procedures have been experimented in order to remove reaction or decomposition byproducts. The first processes for the oxidation of cellulose involved aqueous washing, followed by drying with air. In point of fact, the use of water has the huge disadvantage of prematurely decomposing the oxidized cellulose, which is then unusable as a haemostatic material. Subsequently, washing the oxidized cellulose with water was gradually replaced by washing by means of steeping in a mixture of water and alcohol or by means of steeping in a bath of pure alcohol, followed by drying with air. However, this solution is not satisfactory because, in addition to the high costs of the solvents, it is difficult to remove the alcohol without also further detrimentally affecting the oxidized cellulose. This is because the drying of the oxidized cellulose, thus wetted by an alcohol, brings about an undesirable contraction in the said oxidized cellulose. Furthermore, the use of a pure alcohol to wash a material based on oxidized polysaccharide is not simple to carry out on the industrial scale.

None of the processes described thus makes it possible to easily remove the reaction or decomposition byproducts generated during the oxidation of a polysaccharide-based material, in particular a cellulose-based material, without decomposing and/or detrimentally affecting the said material.

There thus exists a need for a process for washing a material based on oxidized polysaccharide, more particularly on oxidized cellulose, which makes it possible to avoid decomposing and/or detrimentally affecting the said oxidized polysaccharide. It is desirable for the novel process to be able to be employed on an industrial scale and for it to make it possible to obtain materials compatible with the use thereof in the medical or surgical fields. Finally, for medical and environmental reasons, the use of organic solvents would have to be avoided or minimized.

The aim of the present invention is to meet, in all or part, the needs set out above.

To this end, the subject-matter of the present invention is a process for washing a polysaccharide-based material which has been subjected to oxidation by at least one oxidizing agent, the said process comprising a first washing stage in which the said material is flushed with a first densified fluid which is inert with regard to the said oxidizing agent, characterized in that the first stage is followed by a second washing stage in which the said material is flushed with a washing composition comprising at least one second inert densified fluid and at least one alcohol, the said second inert densified fluid being chosen from carbon dioxide, xenon, argon, krypton, ethane, propane, hexafluoroethane, trifluoromethane, chlorotrifluoromethane, chlorodifluoromethane, dichlorodifluoromethane and/or their mixtures.

Flushing is understood to mean, within the meaning of the present invention, that the material to be washed is flushed, percolated or traversed by a stream of the fluid or of the washing composition, preferably continuously, said stream carrying away with it the products which it is desired to remove from the material. Such a flushing; according to the invention, corresponding to an injection, preferably continuous, of the fluid or of the washing composition, makes it possible to efficiently wash the material, that is to say, depending on the washing stage envisaged, to remove the excess oxidizing agent or subsequently to remove the reaction or decomposition byproducts generated during the oxidation of the material. In particular, the flushing according to the invention, that is to say the injection of a stream of fluid or of washing composition which passes through the material, is preferably maintained for the time necessary for the discharge of the products to be removed. In particular, according to the process of the invention, the a material to be washed is not steeped in a static container containing the fluid or the washing composition. This is because such a steeping, due to the fleeting and static nature of the impregnation which it brings about, is different from the dynamic flushing of the process of the invention and does not make it possible to efficiently wash the material, that is to say to efficiently remove the undesired products therefrom.

Thus, the washing process according to the invention makes it possible to obtain a material based on oxidized polysaccharide which is devoid of residual oxidizing agent: this is because, during the first washing stage of the process according to the invention, the flushing of the material by the first inert densified fluid makes possible the transportation and the discharge of the excess of the said oxidizing agent. The process according to the invention also makes it possible to obtain a material based on oxidized polysaccharide which is devoid of the said reaction and/or decomposition byproducts: this is because, during the second washing stage, the flushing of the material by the said washing composition makes possible an enhanced extraction of these byproducts. The process according to the invention advantageously makes it possible, in comparison with the known processes of the prior art, to reduce the amount of alcohol used and to avoid the contraction of the said material: this is because the process according to the invention makes it possible not to resort to a conventional stage of steeping the said material in a bath of alcohol, in addition generally bringing about a shrinking of the said material. Furthermore, the process according to the invention can be carried out on the industrial scale in a simple way, in particular under similar temperature and pressure conditions to the oxidation process described in Patent Application WO 2006/018552. The washing process according to the invention can be carried out following the oxidation process described in Patent Application WO 2006/018552, which advantageously makes it possible to prevent the said material from being exposed to the air or to moisture and thus from being subjected to additional decomposition actions. Finally, the process according to the invention makes it possible to directly package the said material under an inert atmosphere at the end of the washing process according to the invention.

In a preferred embodiment of the washing process according to the invention, the second inert densified fluid is chosen from carbon dioxide, xenon, argon, krypton, ethane, propane and/or their mixtures.

For example, when rare gases, such as xenon, argon or krypton, are compressed to a pressure of 60 bar (6 MPa), they are in the form of densified fluids in which some volatile compounds, such as $NO_2/N_2O_4$ or alcohols of low molar mass, such as methanol, ethanol, propanol or butanol, show a significant solubility.

In one embodiment of the washing process according to the invention, the said washing composition is single-phase. Single-phase is understood to mean, within the meaning of the patent application, that the washing composition forms only a single phase, the said alcohol being completely miscible in the said second inert densified fluid, under the conditions of implementation of the washing process according to the invention.

In one embodiment of the washing process according to the invention, the said process additionally comprises a third washing stage in which the said material is flushed with a third inert densified fluid: this makes it possible in particular to remove the said alcohol deposited on the said polysaccharide-based material during the said second washing stage. The process according to the invention thus makes it possible to avoid the usual stage of drying with air of the processes of the prior art in order to remove the said alcohol, which stage is generally responsible for an additional shrinkage and/or for an additional decomposition of the said material.

It is understood that the amount of first inert densified fluid used during the first stage is sufficient to substantially discharge the oxidation residues, in particular the oxidizing agent. Likewise, the amount of second inert densified fluid used during the second stage is sufficient to substantially remove the reaction and/or decomposition byproducts. Finally, the amount of third inert densified fluid used, if appropriate, during the optional third stage, is sufficient to substantially discharge the alcohol used during the second stage of the process. As the amounts of the various fluids are directly related to the injection times of the flows or streams of these fluids for each stage, it is also understood that, for each stage, the injection time of the fluid, preferably in the form of a continuous flow, is sufficient to substantially discharge the product or products to be removed.

In one embodiment of the washing process according to the invention, the washing composition employed during the second washing stage comprises between approximately 5 and approximately 95% by weight, preferably between approximately 5 and approximately 40% by weight, of the said alcohol, with respect to the total weight of the washing composition.

In one embodiment of the washing process according to the invention, at least one of the washing stages is carried out at a substantially constant temperature chosen within the range between 20° C. and 60° C., preferably between 30° C. and 50° C. A substantially constant temperature makes it possible to avoid the formation of condensation regions. The temperature of the process according to the invention should preferably be maintained above the temperature at which the said material has been subjected to oxidation by the oxidizing agent and below 60° C., in order to prevent decomposition of the material based on oxidized polysaccharide.

In one embodiment of the washing process according to the invention, at least one of the washing stages is carried out in a continuous flow with a substantially constant flow rate of the said first and/or third inert densified fluid and/or of the said washing composition. Preferably, for each washing stage of the process according to the invention, the flushing of the material is carried out in a continuous flow. This is because a continuous flow makes possible efficient discharging of the products to be removed and thus optimum washing of the material.

In one embodiment of the washing process according to the invention, at least one of the washing stages is carried out at a pressure of greater than 30 bar (3 MPa). The pressure of the process according to the invention should preferably be maintained above the pressure at which the said first, second and/or third inert densified fluids can exist.

In one embodiment of the washing process according to the invention, the said first and/or third inert densified fluids are chosen from nitrogen, carbon dioxide, rare gases or their mixtures. Preferably, the said first and third inert densified fluids are identical. Advantageously, the said first and third inert densified fluids are carbon dioxide. Preferably again, the said first and third inert densified fluids are supercritical carbon dioxide.

In one embodiment of the washing process according to the invention, the said first inert densified fluid is used at a pressure below its critical pressure for carrying out the first stage of the said process. In one embodiment of the washing process according to the invention, if appropriate, the said third inert densified fluid is used at a pressure below its critical pressure for carrying out the third stage of the said process.

In another embodiment of the invention, the second washing stage of the said process is carried out at a pressure greater than or equal to the critical pressure of the said second inert densified.

According to one embodiment of the process according to the invention, the second inert densified fluid is carbon dioxide and the said second stage of the washing process is carried out under temperature and pressure conditions such that the said washing composition is in the supercritical form.

In one embodiment of the washing process according to the invention, at least one of the stages of the washing process according to the invention is carried out in the liquid phase. The first and/or second stages as well as the optional third stage of the said washing process according to the invention can be carried out, independently of one another, under temperature and pressure conditions which imply that the said first, second and/or third inert densified fluid respectively is in the liquid phase.

An effective implementation of the washing process according to the invention consists in subjecting the polysaccharide-based material to a flow of the various densified fluids and/or of the washing composition. Thus, in the case of a material composed of a textile, the various densified fluids and/or the washing composition advantageously pass through the said textile.

In one embodiment of the washing process according to the invention, the said alcohol employed during the second washing stage is an alcohol chosen from $C_1$-$C_4$ alcohols and/or their mixtures. Preferably again, the said alcohol employed during the second washing stage is chosen from ethanol, isopropanol and/or their mixtures. $C_1$-$C_4$ alcohols exhibit a good solubility in the inert densified fluid used in the process according to the invention and more particularly in liquid carbon dioxide or supercritical carbon dioxide. In particular, ethanol and isopropanol are alcohols which exhibit the best solubilities in supercritical carbon dioxide. Furthermore, ethanol and isopropanol do not exhibit a high toxicity, like methanol or butanol. For at least one of the two preceding reasons, ethanol and isopropanol are preferred.

In one embodiment of the washing process according to the invention, the said first, second and optionally third washing stages are carried out on a material based on oxidized cellulose. Preferably again, the said first and third inert densified fluids are carbon dioxide and the said second stage is carried out under temperature and pressure conditions such that the said washing composition is in the supercritical form.

The process according to the invention thus makes it possible to minimize the decomposition due to the oxidation and in particular does not contribute additional decomposition normally due to the use of water during the conventional washing stage. The material obtained by the process according to the invention is stable and exhibits advantageous haemostatic and antibacterial properties.

In one embodiment of the washing process according to the invention, the said first, second and optionally third washing stages are carried out on a polysaccharide-based material, in particular cellulose, which has been subjected to oxidation by the unimer $NO_2$, the dimer $N_2O_4$ or their mixtures.

Thus, the invention also relates to a process for washing a cellulose-based material which has been subjected to oxidation by the unimer $NO_2$, the dimer $N_2O_4$ or their mixtures, the said process comprising a first washing stage in which the said material is flushed with a first inert densified fluid which is carbon dioxide, characterized in that the first stage is followed by a second washing stage in which the said material is flushed with a washing composition comprising at least one second inert densified fluid which is carbon dioxide and at least one alcohol, the said washing composition being in the supercritical form.

Concrete but nonlimiting examples are given in order to achieve a better understanding of the invention.

FIG. 1 represents a diagrammatic view of a washing unit which makes it possible to carry out the process according to the invention.

The process according to the invention can be carried out using a washing unit represented diagrammatically in FIG. 1. For example, carbon dioxide used for the implementation of the said process is stored in a container B in the form of a mixture of liquid and gas. It is cooled by a heat exchanger HE1 to a temperature at which it is liquid, approximately 0° C. The carbon dioxide is subsequently pumped by a volumetric pump P1 which makes it possible to control the flow rate of the flow, while the pressure of the carbon dioxide delivered within the washing unit is controlled by the control valve D1. The carbon dioxide is subsequently heated by means of a heat exchanger HE2, before being injected in the form of a densified fluid into an extractor E, where a material based on oxidized polysaccharide, for example oxidized cellulose, is placed. During the second washing stage of the said washing process according to the invention, an alcohol is delivered by means of an injection system comprising an alcohol tank A and a pump P2 of the HPLC (High-Performance Liquid Chromatography) type in order to form a washing composition. The pressure within the extractor E is maintained at the desired value by a control valve D1. From the extractor E, the densified fluid or the washing composition is directed to separators S1, S2 and S3. The said separators S1 and S2 are regulated using valves D2 and D3 respectively. The extractor E and the separators S1 and S2 are thermostatically controlled by a jacket in order to maintain a constant temperature. The products dissolved in the densified fluids and/or the washing composition are recovered at outlets with which the separators are provided. Various pressure indicators P1 and temperature regulators TR are distributed over the washing unit.

During the first washing stage, the carbon dioxide used as first inert densified fluid comprises traces of nitrogen dioxide after being passed through the extractor E. It should be noted that pure carbon dioxide can be recovered after bubbling through sodium hydroxide solution. The carbon dioxide thus recovered can be compressed and recycled in the extractor E.

EXAMPLE 1

Oxidation of a Cellulose Material

A cellulose, textile is oxidized using nitrogen dioxide ($NO_2$) in a pressurized laboratory reactor according to the method described below:

0.5 g of a regenerated cellulose textile is placed in a pressurized cylindrical reactor with a capacity of 135 ml, on a Teflon® tray, in order to prevent the textile from becoming entangled around the magnetic stirrer placed at the bottom of the reactor. The Teflon® tray also makes it possible to prevent contact between the said material and the liquid nitrogen dioxide. The reactor is purged with nitrogen in order to remove the air and then the temperature is increased to 40° C. Subsequently, 1 g of liquid nitrogen dioxide, cooled to approximately 13° C., is injected into the reactor using a dedicated device. The temperature is kept constant for 3 hours, while the pressure increases up to a maximum of 3.1 bar (0.31 MPa). At the end of the reaction, the reactor is rapidly cooled to ambient temperature. The $NO_2$ is immobilized by a sodium hydroxide trap and the reactor is washed with a flow of carbon dioxide.

A textile based on oxidized cellulose is obtained.

EXAMPLE 2

Washing an Oxidized Cellulose Material with Carbon Dioxide and Ethanol

The textile made of material based on oxidized cellulose obtained in the preceding example is placed in a pressurized reactor and the air is carefully purged by a flow of $CO_2$. The pressure is raised 100 bar (10 MPa) and the temperature is adjusted to 40° C. throughout the course of the washing process. $CO_2$ is pumped, then compressed and injected in the supercritical form into the reactor with a constant flow rate of 20 g/min, the flow being directed from the bottom towards the top of the said reactor. The said textile is thus subjected to a first stage of washing with supercritical $CO_2$ for 30 min, during which the material is flushed with the supercritical $CO_2$. During this first washing stage, the excess oxidizing agent, namely excess $NO_2$, is removed. The reaction and/or decomposition byproducts, such as nitrous acid and nitric acid, are subsequently removed during a second stage of washing with a supercritical single-phase washing composition of carbon dioxide and ethanol (96% pure), the proportions of which are 15% by weight ethanol (96% pure) and 85% by weight of $CO_2$, with respect to the total weight of the washing composition. The injection of ethanol is carried out by virtue of accurate pumps, such as those normally used for high-performance liquid chromatography (HPLC) operations. During this stage, the oxidized cellulose textile is flushed with the washing composition with a flow rate of 20 g/min for 1 hour. During this flushing, the ethanol reacts with the reaction byproducts, namely nitric acid and nitrous acid. The liquid extracted is collected in separators. Finally, a third washing stage is carried out by injecting supercritical $CO_2$ into the reactor for 30 min in the form of a flow which flushes the oxidized cellulose textile, in the same way as for the first washing stage, with a flow rate of 20 g/min. This third washing stage makes it possible to remove the residual ethanol used during the second washing stage and to dry the textile. The textile made of material based on oxidized cellulose is finally brought back to ambient temperature and to atmospheric pressure. During the implementation of this process, each stage is carried out in a continuous flow with a substantially constant flow rate of the inert densified fluid or of the washing composition.

The process thus described makes it possible to obtain 200 mg of a washed and dried oxidized cellulose textile. In order to determine the degree of oxidation of the cellulose, the textile obtained is dissolved in 2 ml of 0.5N sodium hydroxide and then diluted with 8 ml of distilled water. The solution is subsequently titrated with a standardized 0.05N HCl solution until the change in colour of the phenolphthalein. The same control change in colour is carried out under the same conditions on the sodium hydroxide solution alone. The carboxylic acid content of the textile, calculated by difference, gives a value of 18.4%.

After such a washing process according to the invention, the textile retains a white appearance and remains flexible, indicating that the material has not decomposed. This is because it has been observed that the decomposition of cellulose normally gives a yellow colouring to the textile. The surface density of the textile sample is subsequently measured in order to determine the effect of the washing process on the contraction of the textile. The textile has not undergone significant contraction.

Finally, the conductivity of a sample of the said washed textile according to the present example is measured in water. Given the difficulty in detecting the presence of a small amount of nitrous acid or nitric acid by conventional spectrometric methods, such a measurement of the conductivity makes it possible to reveal the presence of residual strong acids on the said textile. This is because it has been found that the conductivity increases with the amount of residual nitric acid present in a textile. A washing process effective in removing the nitrogen dioxide and its residual derived products should thus make it possible to obtain the lowest possible conductivity. Thus, 100 mg of washed textile according to the present example are placed in 1 ml of distilled water. After 1 h, a low value of 50 $\mu S/cm^{-1}$ is measured. Such a conductivity indicates that the washing process according to the present example is effective.

EXAMPLE 3

Washing an Oxidized Cellulose Material with Carbon Dioxide and Isopropanol

The textile made of material based on oxidized cellulose obtained according to Example 1 is placed in a pressure-reactor and the air is carefully purged with a flow of $CO_2$. The pressure is raised to 100 bar (1.0 MPa) and the temperature is adjusted to 40° C. throughout the course of the washing process. $CO_2$ is pumped, then compressed and injected in the supercritical form into the reactor with a constant flow rate of 20 g/min, the flow being directed from the bottom towards the top of the reactor. The said textile, is thus subjected to a first stage of washing with supercritical $CO_2$ for 30 min, during which the textile is flushed with the said supercritical $CO_2$ in order to remove the excess $NO_2$, as seen in the preceding example. The reaction and/or decomposition byproducts, such as nitrous acid and nitric acid, are subsequently removed during a second stage of washing with a supercritical washing composition formed of carbon dioxide and isopropanol (99% pure), the proportions of which are 15% by weight of isopropanol (99% pure) and 85% by weight of $CO_2$, with respect to the total weight of the washing composition. The injection of isopropanol is carried out by virtue of accurate pumps, such as those normally used for high-performance liquid chromatography (HPLC) operations. During this stage, the textile made of oxidized cellulose is flushed with the washing composition with a flow rate of 20 g/min for 1 h. During this flushing, isopropanol reacts with the reaction byproducts, namely nitric acid and nitrous acid. The liquid extracted is collected in separators. Finally, in order to remove the residual isopropanol used during the second washing stage and to dry the textile, a third washing stage is carried out by injecting supercritical $CO_2$ into the reactor for 30 min in the form of a flow which flushes the textile made of oxidized cellulose, in the same way as for the first washing stage, with a flow rate of 20 g/min. The textile made of material based on oxidized cellulose is finally brought back to ambient temperature and to atmospheric pressure.

The process thus described makes it possible to obtain 200 mg of a washed and dried textile. Just as for the textile of Example 2, the latter is dissolved in 2 ml of 0.5N sodium hydroxide and then diluted with 8 ml of distilled water. The solution is subsequently titrated with a standardized 0.05N HCl solution until the change in colour of the phenolphthalein. The same control titration is carried out under the same conditions on the sodium hydroxide solution alone. The carboxylic acid content of the textile, calculated by difference, gives a value of 20%.

After such a washing process according to the invention, the textile retains a white appearance and remains flexible, indicating the material has not decomposed. The surface density of the textile sample is subsequently measured, in order to determine the effect of the washing process on the contraction of the textile. The textile has not undergone a significant contraction.

Finally, the conductivity of a sample of the washed textile according to the present example is measured in the water. Given the difficulty in detecting the presence of a small amount of nitrous acid or nitric acid by conventional spectrometric methods, such a measurement of the conductivity makes it possible to reveal the presence of residual strong acids on the said textile. Thus, 100 mg of washed textile according to the present example are placed in 1 ml of distilled water. After 1 h, a low value of 167 $\mu S \cdot cm^{-1}$ is measured. Such a conductivity means that the washing process according to the present example is efficient.

EXAMPLE 4

In Situ Washing of a Textile Made of Oxidized Cellulose with Carbon Dioxide and Ethanol Subsequent to Oxidation Under Semiindustrial Conditions Oxidation of the Textile:

A cellulose textile is oxidized in a pilot plant following the method described below: 200 g of a regenerated cellulose textile are placed in a 4 L cylindrical reactor, wound around a shaft made of stainless steel pierced with a multitude of holes. The form of the plant is such that the reactor is connected to a circulation loop, comprising a heat exchanger and a centrifugal pump, intended to circulate a fluid at a controlled temperature through the textile.

The shaft made of stainless steel is inserted into the reactor preheated to a temperature of 40° C. using a jacket. The reactor is sealed and then purged with nitrogen in order to discharge the air. Carbon dioxide ($CO_2$) is then injected until a pressure of 50 bar is reached. Subsequently, 210 g of liquid nitrogen dioxide ($NO_2$), cooled to approximately 13° C., are injected into the reactor by means of a dedicated device. The temperature is kept constant (i.e., 40° C.) for 2 h 15, while the pressurized $CO_2/NO_2$ mixture, impelled by the circulating pump, passes continuously through the textile.

A textile based on oxidized cellulose is obtained.

Washing with Carbon Dioxide and Ethanol:

Once the oxidation stage is complete, the pressure is raised to 200 bar (20 MPa) by injection of $CO_2$. The temperature remains adjusted at 40° C. throughout the course of the washing process. A pressure control valve situated on the control loop is then adjusted in order to open at 200 bar while $CO_2$ is injected in the supercritical form into the reactor with a constant flow rate of 15 kg/h, the flow passing through the said reactor. The said textile is thus subjected to a first washing stage for 60 min, during which the material is flushed with a continuous flow of a first inert densified fluid consisting of supercritical $CO_2$. The continuous injection of $CO_2$ is accomplished using a variable flow diaphragm pump by adjusting a vernier which affects the stroke of the piston. At the outlet, the $CO_2/NO_2$ mixture then passes through a chamber filled with an aqueous sodium hydroxide solution (1 mol/l) in order to trap the $NO_2$.

The reaction and/or decomposition byproducts, such as nitrous acid and nitric acid, are subsequently removed during a second washing stage by continuously injecting for 120 min a supercritical single-phase washing composition formed of ethanol and of a second inert densified fluid composed of $CO_2$ under similar pressure conditions (i.e., 200 bar). The respective flow rates of $CO_2$ and ethanol are then 15 kg/h and 5 l/h. The continuous injection of ethanol is carried out in particular using a variable flow diaphragm pump by varying the frequency of the motor. The liquid extracted is collected, via separators, in a dedicated container.

Finally, a third washing stage is carried out by injecting a third inert densified fluid composed of supercritical $CO_2$ into the reactor for 60 min in the form of a flow which flushes the oxidized cellulose textile, in the same way as for the first washing stage, with a flow rate of 2.5 kg/h. The textile made of material based on oxidized cellulose is finally brought back to ambient temperature and to atmospheric pressure by slowly depressurizing the pilot plant. During the implementation of this process, each stage is thus carried out in a continuous flow with a substantially constant flow rate of the inert densified fluids or of the washing composition.

The process thus described makes it possible to obtain 200 g of a washed and dried, oxidized cellulose textile. In order to determine the degree of oxidation of the cellulose, the said textile is cut out for analysis. Various samples of 200 mg are dissolved in 2 ml of 0.5N sodium hydroxide and then diluted with 8 ml of distilled water. The solutions thus obtained are then titrated with a standardized 0.05N HCl solution until the change in colour of the phenolphthalein. The same control titration is carried out under the same conditions on the sodium hydroxide solution alone. The carboxylic acid content of the various pieces of textile, calculated by difference, gives a mean value of 13.5%. After such a washing process according to the invention, the textile retains a white appearance and remains flexible indicating that the material has not decomposed. The mean surface density of the textile sample is subsequently measured in order to determine the effect of the washing process on the contraction of the textile. The textile has not undergone a significant contraction.

Finally, the conductivity of a sample of the said washed textile according to the present example is measured in water. Thus, 100 mg of washed textile are placed in 1 ml of distilled water. After 1 h, a low value of 81 $S \cdot cm^{-1}$ is measured. Such a conductivity indicates that the washing process is efficient.

Thus, the washing process according to the invention makes it possible to obtain efficient washing, the reaction and/or decomposition byproducts being removed. The process according to the invention can be carried out under the same conditions as the oxidation in a supercritical medium, which simplifies the industrial implementation thereof. The process according to the invention also makes it possible to minimize the use of alcohol and to avoid the use of other polluting organic solvents. Finally, as the conventional stage of steeping in a bath of alcohol is no longer necessary, the said process makes it possible to avoid shrinkage of the textile.

What is claimed is:

1. A process for washing a polysaccharide-based material which has been subjected to oxidation by at least one oxidizing agent, the process comprising;
   a first washing stage in which the polysaccharide-based material is flushed with a first densified fluid which is inert with regard to the oxidizing agent;
   a second washing stage in which the polysaccharide-based material after the first washing stage is flushed with a washing composition comprising at least one second inert densified fluid and at least one alcohol, the second inert densified fluid is selected from the group consisting of carbon dioxide, xenon, argon, krypton, ethane, propane, hexafluoroethane, trifluoromethane, chlorotrifluoromethane, chlorodifluoromethane, dichlorodifluoromethane, and mixtures thereof, and
   a third washing stage in which the polysaccharide-based material after the second washing stage is flushed with a third inert densified fluid, wherein the polysaccharide-based material which has been subjected to oxidation is oxidized cellulose.

2. The process according to claim 1, wherein the second inert densified fluid is selected from the group consisting of carbon dioxide, xenon, argon, krypton, ethane, propane, and mixtures thereof.

3. The process according to claim 1, wherein the washing composition employed during the second washing stage comprises between approximately 5 and approximately 95% by weight, of the alcohol, with respect to the total weight of the washing composition.

4. The process according to claim 1, wherein at least one of the washing stages is carried out at a substantially constant temperature between about 20° C. and about 60° C.

5. The process according to claim 1, wherein at least one of the washing stages is carried out in a continuous flow with a substantially constant flow rate of the first and/or third inert densified fluid and/or of the washing composition.

6. The process according to claim 1, wherein at least one of the washing stages is carried out at a pressure of greater than 30 bar.

7. The process according to claim 1, wherein the alcohol employed during the second washing stage is an alcohol selected from $C_1$-$C_4$ alcohols and mixtures thereof.

8. The process according to claim 7, wherein the alcohol employed during the second washing stage is selected from the group consisting of ethanol, isopropanol, and mixtures thereof.

9. The process according to claim 1, wherein the second inert densified fluid is carbon dioxide and the second stage of the washing process is carried out under temperature and pressure conditions such that the washing composition is in the supercritical form.

10. The process according to claim 1, wherein the first and/or third inert densified fluids are selected from the group consisting of nitrogen, carbon dioxide, rare gases, and mixtures thereof.

11. The process according to claim 10, wherein the first and third inert densified fluids are identical.

12. The process according to claim 11, wherein the first and third inert densified fluids are carbon dioxide.

13. The process according to claim 12, wherein the first and third inert densified fluids are supercritical carbon dioxide.

14. The process according to claim 1, wherein the first, second and third inert densified fluids are carbon dioxide and the second stage is carried out under temperature and pressure conditions such that the washing composition is in the supercritical form.

15. The process according to claim 1, wherein the first, second and optionally third washing stages are carried out on a polysaccharide-based material which has been subjected to oxidation by a material selected from the group consisting of unimer $NO_2$, dimer $N_2O_4$, and mixtures thereof.

16. The process according to claim 1, wherein the washing composition employed during the second washing stage comprises between approximately 5 and approximately 40% by weight, of the alcohol, with respect to the total weight of the washing composition.

17. The process according to claim 1, wherein at least one of the washing stages is carried out at a substantially constant temperature between about 30° C. and about 50° C.

* * * * *